(12) United States Patent
Rozploch

(10) Patent No.: US 10,194,080 B2
(45) Date of Patent: Jan. 29, 2019

(54) MULTIPLE CHANNEL IMAGING SYSTEM

(71) Applicant: Sensors Unlimited, Inc., Princeton, NJ (US)

(72) Inventor: Robert Rozploch, Newtown, PA (US)

(73) Assignee: Sensors Unlimited, Inc., Princeton, NJ (US)

( * ) Notice: Subject to any disclaimer, the term of this patent is extended or adjusted under 35 U.S.C. 154(b) by 572 days.

(21) Appl. No.: 14/877,681

(22) Filed: Oct. 7, 2015

(65) Prior Publication Data
US 2017/0104930 A1    Apr. 13, 2017

(51) Int. Cl.
| | |
|---|---|
| *H04N 9/45* | (2006.01) |
| *G06K 9/20* | (2006.01) |
| *G06K 9/32* | (2006.01) |
| *H04N 5/232* | (2006.01) |
| *H04N 5/225* | (2006.01) |
| *H04N 5/33* | (2006.01) |
| *H04N 5/247* | (2006.01) |

(52) U.S. Cl.
CPC ....... *H04N 5/23241* (2013.01); *H04N 5/2258* (2013.01); *H04N 5/23229* (2013.01); *H04N 5/23245* (2013.01); *H04N 5/247* (2013.01); *H04N 5/332* (2013.01)

(58) Field of Classification Search
CPC .......... H04N 5/00; H04N 5/232; H04N 5/247; H04N 5/33; H04N 5/332; H04N 5/225; H04N 13/00; H04N 13/0277; H04N 7/18; G02B 27/1013
See application file for complete search history.

(56) References Cited

U.S. PATENT DOCUMENTS

| | | |
|---|---|---|
| 7,471,334 B1 | 12/2008 | Stenger |
| 7,977,634 B2 | 7/2011 | Thiele et al. |
| 8,675,063 B2 | 3/2014 | Bentkovski |
| 8,885,200 B2 | 11/2014 | Yoshioka |

(Continued)

FOREIGN PATENT DOCUMENTS

GB    2440553 A    2/2008

OTHER PUBLICATIONS

Extended European Search Report issued in corresponding European Patent Application No. EP 16192906.2, dated Feb. 2, 2017.
(Continued)

*Primary Examiner* — Jeffery A Williams
*Assistant Examiner* — Patricia I Young
(74) *Attorney, Agent, or Firm* — Locke Lord LLP; Scott D. Wofsy; Joshua L. Jones

(57) ABSTRACT

A method of imaging includes monitoring a field of view with a first imaging sensor of a multiple channel imaging system and activating a second component of the imaging system from a stand by state to an active state upon detection of a change in the field of view of the first imaging sensor. The second component can include a second imaging sensor. The second imaging sensor can have a field of view overlapping with the field of view of the first imaging sensor. The first imaging sensor can be configured for imaging in a first spectral range, wherein the second imaging sensor is configured for imaging in a second spectral range that is different from the first spectral range. The first and second spectral ranges can be overlapping or non-overlapping.

15 Claims, 4 Drawing Sheets

(56) References Cited

U.S. PATENT DOCUMENTS

| | | |
|---|---|---|
| 9,041,785 B2 | 5/2015 | Wang |
| 2005/0052755 A1 | 3/2005 | Lawson et al. |
| 2011/0187489 A1 | 8/2011 | Lee |
| 2014/0253735 A1* | 9/2014 | Fox .................... H04M 1/0254 348/164 |
| 2014/0375820 A1 | 12/2014 | Priyantha et al. |
| 2018/0229889 A1 | 8/2018 | Li |

OTHER PUBLICATIONS

European Patent Office Communication issued in corresponding European Patent Application No. 16192906.2, dated Oct. 25, 2018.

* cited by examiner

MULTIPLE CHANNEL IMAGING SYSTEM

BACKGROUND OF THE INVENTION

1. Field of the Invention

The present disclosure relates to imaging systems, and more particularly to multiple channel imaging such as used in systems having channels for multiple spectral bands such as visible and one or more infrared bands.

2. Description of Related Art

A variety of devices and methods are known in the art for multiple channel imaging. In a system with channels for imaging in multiple different spectral bandwidths, it is possible to fuse information from the different bandwidths into a single output image that combines useful information from the various bandwidths. For example, by combining thermal imaging from an infrared bandwidth with visible light imaging, a composite image can be created for output containing the most valuable information from the thermal imaging overlaid on an image formed from visible light. The combined image can highlight hot or cold spots while providing the viewer a visual context to pinpoint the locations of the cold or hot spots, for example.

Such conventional methods and systems have generally been considered satisfactory for their intended purpose. However, there is still a need in the art for improved multiple channel imaging systems, especially in the area of reducing the overall power consumption of such systems. The present disclosure provides a solution for this need.

SUMMARY OF THE INVENTION

A method of imaging includes monitoring a field of view with a first imaging sensor of a multiple channel imaging system and activating a second component of the imaging system from a stand-by state, e.g., a low power state, to an active state upon detection of a change in the field of view of the first imaging sensor.

The second component can include a second imaging sensor. The second imaging sensor can have a field of view overlapping with the field of view of the first imaging sensor. The first imaging sensor can be configured for imaging in a first spectral range, wherein the second imaging sensor is configured for imaging in a second spectral range that is different from the first spectral range. The first and second spectral ranges can be overlapping or non-overlapping. For example, the first spectral range can be a thermal imaging range, and the second spectral range can be a range including at least one of visible, near-infrared (NIR), short-wavelength infrared (SWIR), mid-wavelength infrared (MWIR), long-wavelength infrared (LWIR), or any other suitable range.

Detection of a change in the field of view of the first imaging sensor can include detecting a change in contrast in the field of view of the first imaging sensor, such as a change in contrast indicative of a change in temperature. In addition to or in lieu of a change in contrast, detection of change in the field of view of the first imaging sensor can include detecting movement of an object within the field of view.

The method can include outputting a composite image combining information from each of the first and second imaging sensors. The method can include deactivating the second imaging sensor of the imaging system from an active state to a stand by state upon detection of inactivity in the field of view by at least one of the first or second imaging sensors. The standby state can include at least one of complete shutdown, operating at reduced resolution, at reduced frame rate, or operating at reduced imaging sensitivity for the second component.

An imaging system includes a first imaging sensor operatively connected to a controller and a second component operatively connected to the controller. The controller includes machine readable instructions configured to cause the controller to carry out any of the method embodiments described above.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
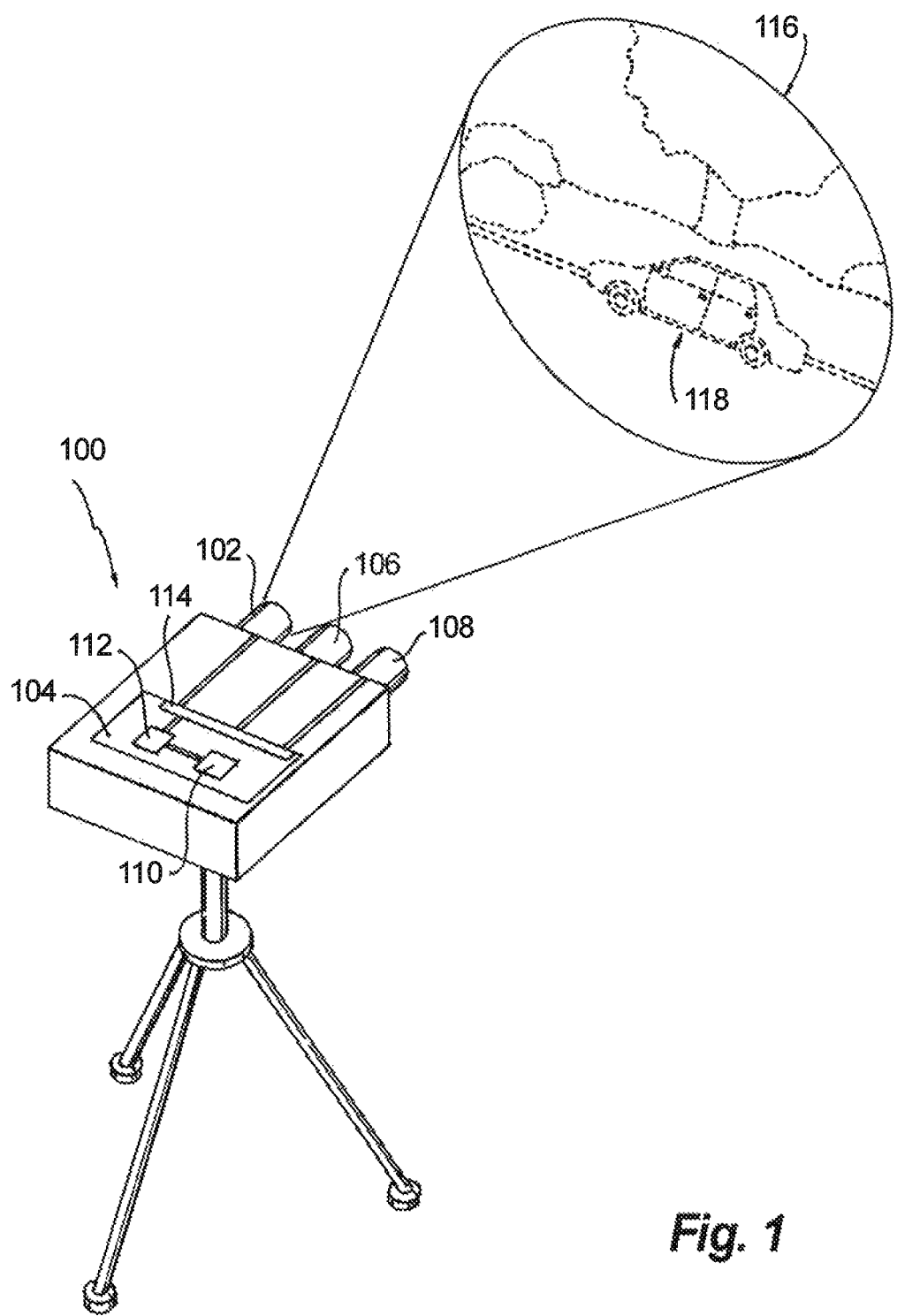
FIG. 1 is a schematic view of an exemplary embodiment of an imaging system constructed in accordance with the present disclosure, showing a first imaging sensor monitoring a field of view.

Reference will now be made to the drawings wherein like reference numerals identify similar structural features or aspects of the subject disclosure. For purposes of explanation and illustration, and not limitation, a partial view of an exemplary embodiment of an imaging system in accordance with the disclosure is shown in FIG. 1 and is designated generally by reference character 100. Other embodiments of imaging systems in accordance with the disclosure, or aspects thereof, are provided in FIGS. 2-4, as will be described. The systems and methods described herein can be used to manage power in multiple channel imaging systems.

Imaging system 100 is a multiple channel imaging system and includes a first imaging sensor 102 operatively connected to a controller 104. Second and third imaging sensors 106 and 108 are also operatively connected to controller 104. Controller 104 includes machine readable instructions, e.g., stored in a memory 110 and executed by processor 112 to control imaging sensors 102, 106, and 108 and to provide output by way of input/output interface 114. The machine readable instructions can be configured to cause the controller to carry out any one or more of the method embodiments described herein.

A method of imaging includes monitoring a field of view 116 with first imaging sensor 102 of a multiple channel imaging system 100 and activating a second component of imaging system 100 from a stand-by state, e.g., a low power state, to an active state upon detection of a change in the field of view 116 of first imaging sensor 102. The second component can include imaging sensor 106, imaging sensor 108, any other suitable system elements, and/or any suitable imaging hardware such as additional channels, sensors, and/or electronics.

As shown schematically, the scene in field of view 116 can include a relatively low contrast level, as indicated by the broken lines in FIG. 1. For example, first imaging sensor 102 can be sensitive to a thermal imaging spectral range, and if the scene in field of view 116 is all at a roughly even ambient temperature, the scene will result in a relatively low contrast image from first imaging sensor 102.

Figure 2:
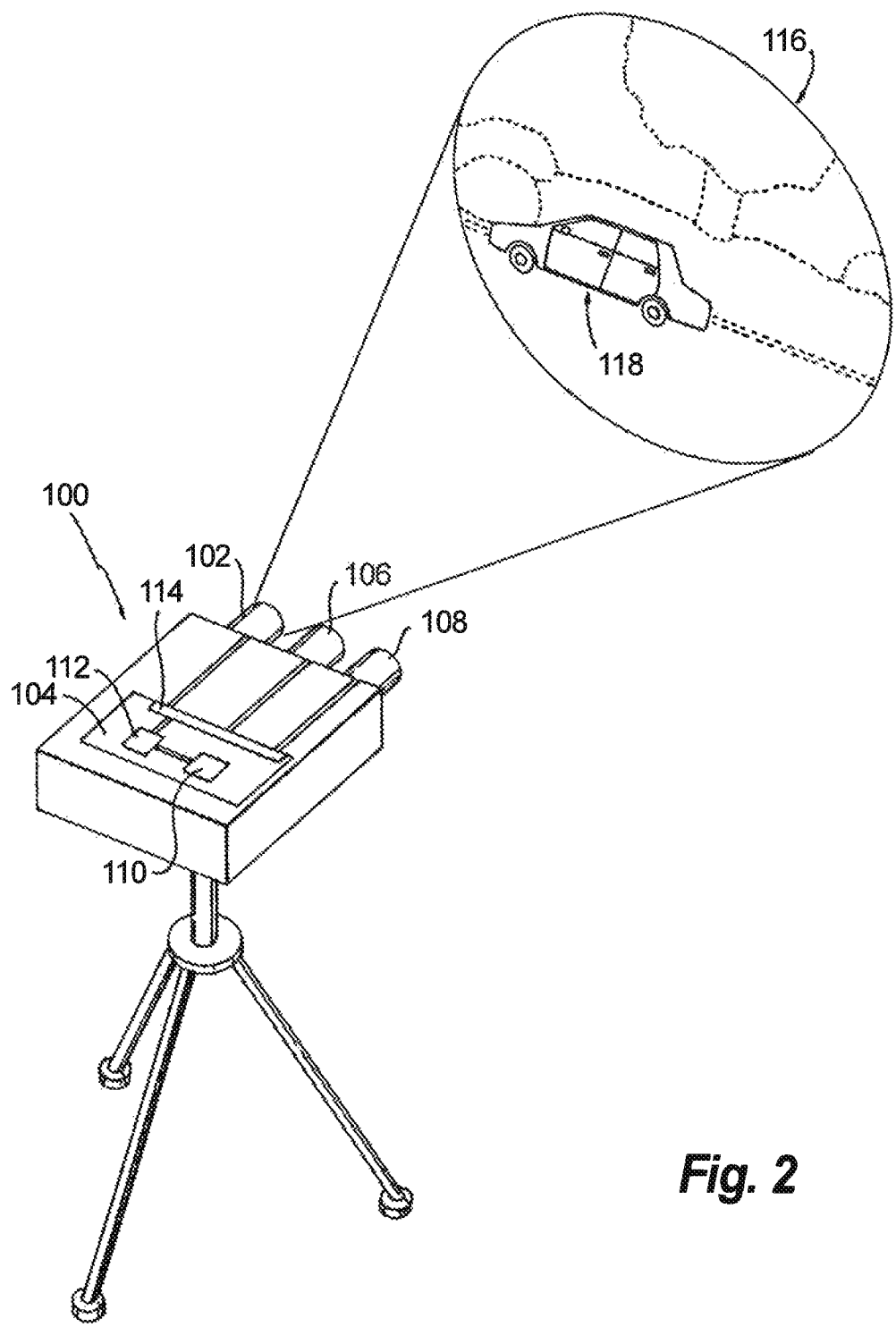
FIG. 2 is a schematic view of the imaging system of FIG. 1, showing a change in contrast and movement of an object within the field of view.

Referring now to FIG. 2, a change in the scene within field of view 116 is indicated schematically. Specifically, object 118 moves from its position in FIG. 1 to its position in FIG. 2. Additionally, object 118 increases in contrast against the rest of the scene in FIG. 2 relative to its contrast level in FIG. 1. This is indicated schematically by the solid lines of object 118 in FIG. 2. This change in contrast is possible, for example, if object 118 increases or decreases temperature, wherein imaging sensor 102 is configured for thermal imaging. It is contemplated that change in contrast and movement can both be used together as a criterion for activating the second component, or only one of change in contrast and movement could be used as suitable for a given application. It is also contemplated that predetermined thresholds can be used for contrast and/or movement in determining whether a given change is sufficient for controller 104 to activate the second component. For example, if controller 104 is configured to require both movement and temperature in excess of a given threshold, it is possible to operate using only imaging sensor 102 even if a portion of the image exceeds the temperature threshold as long as that portion of the image is not moving. In this example, only when movement is detected for a portion of the image that also exceeds the threshold temperature does controller 104 activate the second component.

Figure 3:
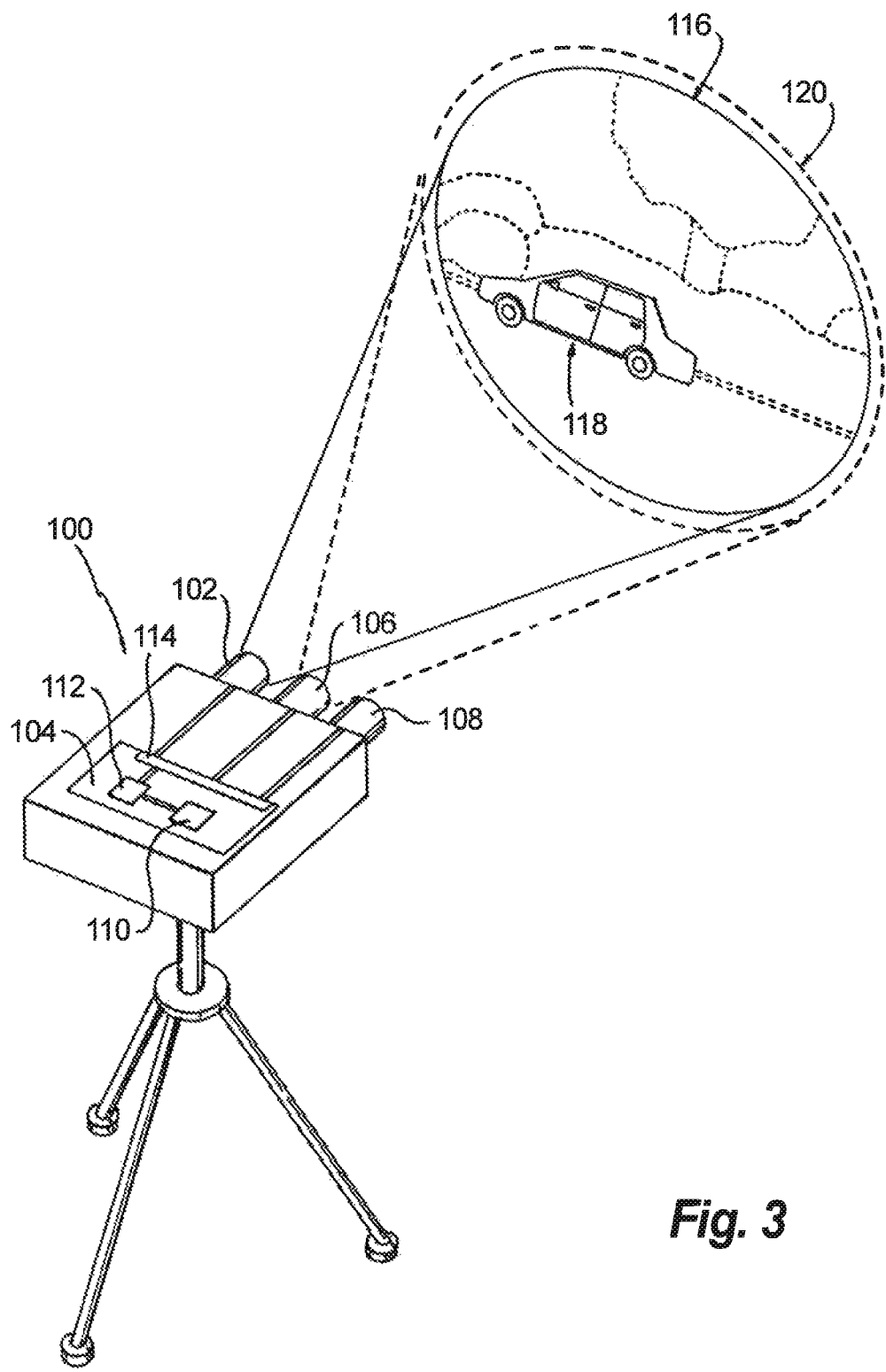
FIG. 3 is a schematic view of the imaging system of FIG. 1, showing a second imaging sensor activated and monitoring a second field of view overlapping with the first field of view.

Referring now to FIG. 3, in response to the change in field of view 116 detected by first imaging sensor 102, controller 104 activates second imaging sensor 106, which has a second field of view 120 overlapping with the first field of view 116, e.g., the first and second fields of view 116 and 120 can be similar or identical with respect to the scene. While first imaging sensor 102 can be configured for imaging in a first spectral range, e.g., a thermal imaging range, second imaging sensor 106 is configured for imaging in a second spectral range that is different from the first spectral range. The first and second spectral ranges can be overlapping or non-overlapping. For example, the first spectral range can be a thermal imaging range, and the second spectral range can be a range including at least one of visible, near-infrared (NIR), short-wavelength infrared (SWIR), mid-wavelength infrared (MWIR), long-wavelength infrared (LWIR), or any other suitable range. Third imaging sensor 108 is not shown activated in FIG. 3 for sake of clarity, however, it is also contemplated that the second component activated by controller 104 can include third imaging sensor 108, which can have a similar or identical field of view with the other imaging sensors 102 and 106, and can have a different spectral imaging range from the other two imaging sensors 102 and 106. Those skilled in the art will readily appreciate that having three imaging sensors is just one example, and that any suitable number of two or more imaging sensors can be used without departing from the scope of this disclosure.

Imaging system 100 is a multiple channel system, which allows imaging in multiple channels or bandwidth ranges, such as the ranges listed out above or any other suitable ranges. Since during times of relative inactivity and/or low contrast only one imaging sensor needs to be active, power can be conserved during such times by leaving other sensors in a stand by state. When activity of interest takes place in the field of view 116, other channels can be activated.

Figure 4:
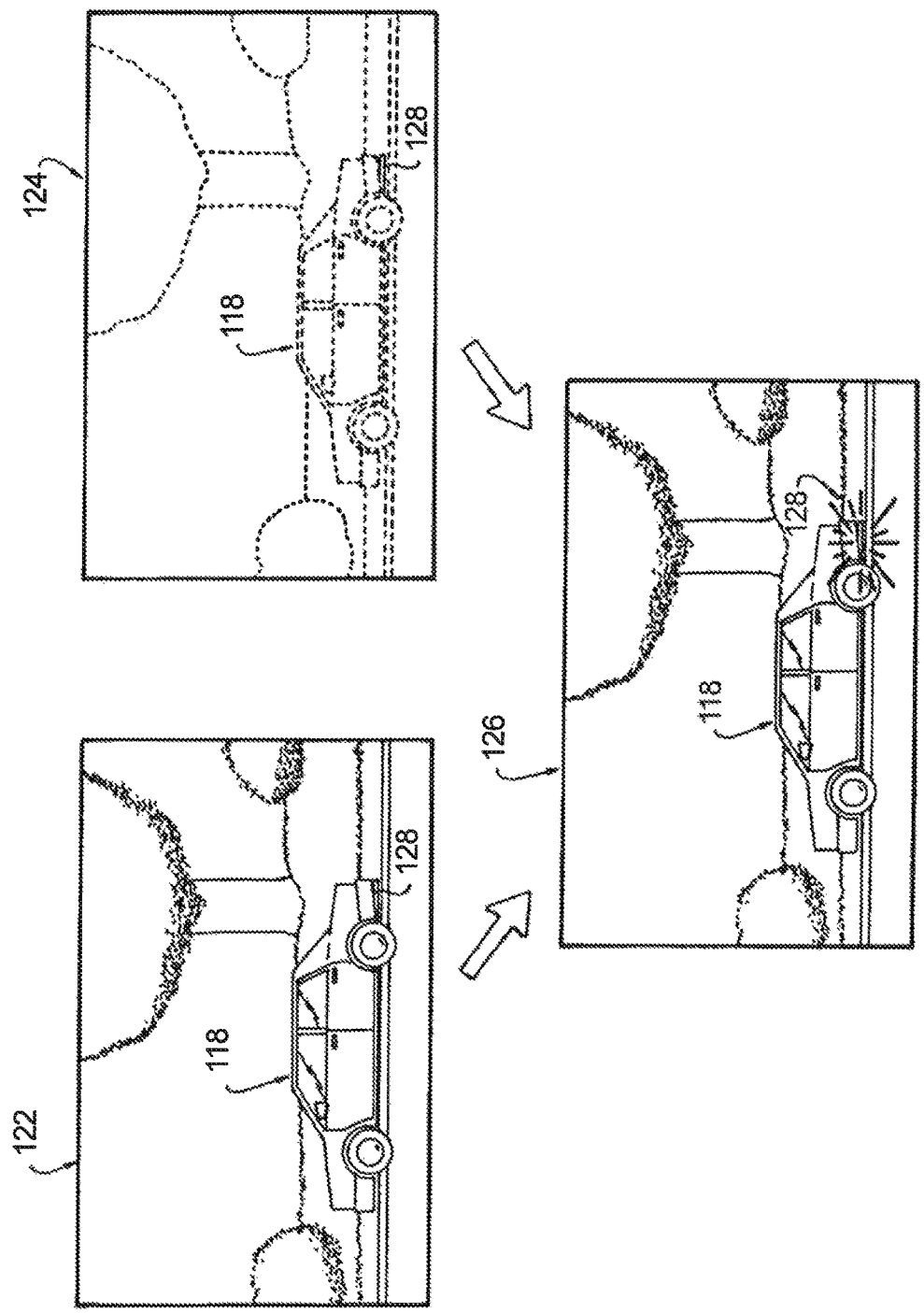
FIG. 4 is a schematic view of exemplary images from the first and second imaging sensors of FIG. 1, showing a composite image combining information from each of the first and second imaging sensors.

Multiple channels allow system 100 to output composite images, wherein each composite image combines information from each of the first and second imaging sensors 102 and 106, for example. Referring to FIG. 4, images 122 and 124 are schematically representative of images from imaging sensor 106, e.g., a visible spectral range image, and from imaging sensor 102, e.g., a thermal spectral range image, respectively. In image 122, the object 118 is visible, including surroundings. In image 124, a thermal image, object 118 and the surroundings are in relatively low contrast, but one portion 128 of object 118 is in high contrast with the rest of the scene, e.g. indicating a higher temperature than the rest of the scene as indicated by the solid lines for portion 128 in image 124. In composite image 126, most of the image is the same as image 122, however, portion 128 is indicated with rays to provide information about the high temperature. In this example, object 118 is a car, and portion 128 is the tailpipe of car 118. The composite image could allow a viewer to make inferences that may not be intuitive from a single one of images 122 and 124 alone. For example, in composite image 126 it may be possible to infer what the engine of car 118 is doing, based on the information that tailpipe 128 is a hot spot.

Controller 104 can deactivate the second component, e.g., including imaging sensor 106, from the active state to the stand-by state upon detection of inactivity in the field of view for a designated period of time with the controller 104, e.g., field of view 116 and/or 120, by at least one of the first or second imaging sensors 102 and 106. For example, after a scene in the field of view becomes low in contrast and/or has an absence of movement for a predetermined amount of time, controller 104 can return the second component to the standby state. The stand-by state can include at least one of complete shutdown, operating at reduced resolution, operating at reduced frame rate, or operating at reduced imaging sensitivity, or any other suitable reduced power mode of operation. It is contemplated that controller 104 can be user programmable to define custom settings for the level of shutdown in standby mode and/or thresholds for entering/exiting stand-by mode, as will be readily appreciated and understood by those skilled in the art having the benefit of this disclosure.

It is contemplated that system 100 can be a permanent system with a permanent, e.g., wired, power connection such as in a permanent surveillance system. It is also contemplated that system 100 can be a portable system, such as powered by an onboard battery. Whether powered by battery or hard line electrical connection to a power source, system 100 can benefit from techniques disclosed herein, e.g., to reduce power consumption. In portable, battery powered applications, techniques disclosed herein can allow for reduced size and weight due to lower battery requirements compared to traditional systems and techniques.

Potential advantages of embodiments described herein compared to traditional systems and techniques include lower power consumption and/or extended operation on a given battery charge. For systems employing imaging sensors that require thermal management for proper operation, embodiments herein can reduce the requirements for thermal management compared to traditional systems and techniques due to fact that at least some of the imaging sensors are not always active. The reduced power dissipation of embodiments disclosed herein can also result in less heat generated compared to traditional systems and techniques, leading to increased reliability over a given system lifetime.

The methods and systems of the present disclosure, as described above and shown in the drawings, provide for multiple channel imaging with superior properties including improved power management compared to traditional systems. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A method of imaging comprising:
   monitoring a field of view with a first imaging sensor of a multiple channel imaging system; and
   monitoring the field of view with a second imaging sensor of the multiple channel imaging system, wherein the second imaging sensor monitors the field of view in a stand by state;
   activating second imaging sensor from the stand by state to an active state upon detection of a change in the field of view of the first imaging sensor, wherein the activating the second imaging sensor from the standby state includes at least one of increasing resolution, increasing frame rate, or increasing imaging sensitivity for the second imaging sensor.

2. The method as recited in claim 1, wherein the second imaging sensor has a field of view overlapping with the field of view of the first imaging sensor.

3. The method as recited in claim 1, wherein the first imaging sensor is configured for imaging in a first spectral range, and wherein the second imaging sensor is configured for imaging in a second spectral range that is different from the first spectral range.

4. The method as recited in claim 3, wherein the first and second spectral ranges are non-overlapping.

5. The method as recited in claim 3, wherein the first spectral range is a thermal imaging range, and wherein the second spectral range is a range including at least one of visible, NIR, SWIR, MWIR, or LWIR.

6. The method as recited in claim 1, further comprising:
   outputting a composite image combining information from each of the first and second imaging sensors.

7. The method as recited in claim 1, further comprising:
   deactivating the second imaging sensor of the imaging system from an active state to a stand by state upon detection of inactivity in the field of view by at least one of the first or second imaging sensors.

8. The method as recited in claim 1, wherein detection of a change in the field of view of the first imaging sensor includes detecting a change in contrast in the field of view of the first imaging sensor.

9. The method as recited in claim 8, wherein detecting a change in contrast includes detecting a change in contrast indicative of a change in temperature.

10. The method as recited in claim 1, wherein detection of change in the field of view of the first imaging sensor includes detecting movement of an object within the field of view.

11. The method as recited in claim 10, wherein detection of change in the field of view of the first imaging sensor includes detecting both movement and a change in contrast indicative of a change in temperature in order to activate the second component.

12. An imaging system comprising:
    a first imaging sensor operatively connected to a controller;
    a second component operatively connected to the controller, wherein the controller includes machine readable instructions configured to cause the controller to:
       monitor a field of view with the first imaging sensor;
       monitor the field of view with a second imaging sensor, wherein the second imaging sensor monitors the field of view in a stand by state; and
       activate the second imaging sensor from the stand by state to an active state upon detection of a change in the field of view of the first imaging sensor, wherein activating the second imaging sensor from the standby state includes at least one of increasing resolution, increasing frame rate, or increasing imaging sensitivity for the second imaging sensor.

13. The imaging system as recited in claim 12, wherein the first imaging sensor is configured to image in a thermal spectral range, wherein the second imaging sensor is configured to image in a second range that is different from the thermal spectral range, and wherein the machine readable instructions include instructions configured to cause the controller to activate the second imaging sensor from the stand by state to the active state upon detection of both movement and a change in contrast indicative of a change in temperature in the field of view of the first imaging sensor.

14. The method of claim 1, further comprising receiving input at a controller to define custom settings for the level of shutdown in standby mode and/or thresholds for entering existing standby mode.

15. The imaging system of claim 13, wherein the machine readable instructions include instructions configured to cause the controller to receive input at a controller to define custom settings for the level of shutdown in standby mode and/or thresholds for entering existing standby mode.

* * * * *